(12) United States Patent
Merjanian et al.

(10) Patent No.: US 11,070,940 B2
(45) Date of Patent: Jul. 20, 2021

(54) GEOFENCED MESH NETWORK COMMUNICATION

(71) Applicant: Titan Health & Security Technologies, Inc., Newport Beach, CA (US)

(72) Inventors: Vic A. Merjanian, Newport Beach, CA (US); Eduardo Juarez, Newport Beach, CA (US); Ryan Khalili, Newport Beach, CA (US); Daniel Wallengren, Newport Beach, CA (US); Serene Nasser, Newport Beach, CA (US); Ed Merjanian, Newport Beach, CA (US)

(73) Assignee: TITAN HEALTH & SECURITY TECHNOLOGIES, INC., Newport Beach, CA (US)

( * ) Notice: Subject to any disclaimer, the term of this patent is extended or adjusted under 35 U.S.C. 154(b) by 0 days.

(21) Appl. No.: 16/934,966

(22) Filed: Jul. 21, 2020

(65) Prior Publication Data
US 2020/0351609 A1 Nov. 5, 2020

Related U.S. Application Data

(60) Continuation of application No. 16/559,294, filed on Sep. 3, 2019, now Pat. No. 10,856,103, which is a (Continued)

(51) Int. Cl.
*H04W 4/021* (2018.01)
*H04W 4/90* (2018.01)
(Continued)

(52) U.S. Cl.
CPC .............. *H04W 4/021* (2013.01); *H04B 7/02* (2013.01); *H04B 7/0617* (2013.01);
(Continued)

(58) Field of Classification Search
CPC ....... H04W 4/021; H04W 4/029; H04W 4/21; H04W 4/025; H04W 4/90; H04W 4/023;
(Continued)

(56) References Cited

U.S. PATENT DOCUMENTS 9,300,581 B1 *   3/2016   Hui ...................... H04L 45/741
2017/0149795 A1 * 5/2017   Day, II ................. G06F 21/6218
(Continued)

*Primary Examiner* — Fred A Casca
(74) *Attorney, Agent, or Firm* — Sheppard, Mullin, Richter & Hampton LLP

(57) ABSTRACT

A mesh network includes a source node and non-source nodes. The source node generates geofenced message information defining a geofenced message for one or more non-source nodes within a geofence. The source node transmits the geofenced message information for reception by a non-source node within a communication range of the source node. The non-source node, responsive to receiving the geofenced message information, transmits the geofenced message information for reception by other non-source nodes within a communication range of the non-source node. Based on the location of the non-source node being within the geofence, the non-source node presents the geofenced message. Based on the location of the non-source node being within the geofence, the non-source node does not presents the geofenced message.

18 Claims, 6 Drawing Sheets

Related U.S. Application Data division of application No. 16/149,358, filed on Oct. 2, 2018, now Pat. No. 10,405,133.

(51) Int. Cl.

| | | |
|---|---|---|
| *H04W 4/029* | (2018.01) | |
| *H04W 16/28* | (2009.01) | |
| *H04W 88/06* | (2009.01) | |
| *H04B 7/06* | (2006.01) | |
| *H04W 16/00* | (2009.01) | |
| *H04W 4/02* | (2018.01) | |
| *H04B 7/02* | (2018.01) | |
| *H04W 84/18* | (2009.01) | |
| *H01Q 1/24* | (2006.01) | |
| *H01Q 3/32* | (2006.01) | |
| *H04L 1/06* | (2006.01) | |
| *H04L 1/02* | (2006.01) | |
| *H04L 5/00* | (2006.01) | |
| *H04B 7/022* | (2017.01) | |
| *H04B 7/0413* | (2017.01) | |

(52) U.S. Cl.
CPC .......... *H04W 4/025* (2013.01); *H04W 4/029* (2018.02); *H04W 4/90* (2018.02); *H04W 16/00* (2013.01); *H04W 16/28* (2013.01); *H04W 88/06* (2013.01); *H01Q 1/246* (2013.01); *H01Q 3/32* (2013.01); *H04B 7/022* (2013.01); *H04B 7/0413* (2013.01); *H04B 7/0619* (2013.01); *H04B 7/0697* (2013.01); *H04L 1/02* (2013.01); *H04L 1/06* (2013.01); *H04L 1/0668* (2013.01); *H04L 1/0681* (2013.01); *H04L 5/003* (2013.01); *H04L 5/0007* (2013.01); *H04W 84/18* (2013.01)

(58) Field of Classification Search
CPC .......... H04W 4/04; H04W 4/08; H04W 4/06; H04W 4/185; H04W 84/18; H04W 8/005; G06Q 50/01; G06Q 20/327; G06Q 30/0261
See application file for complete search history.

(56) References Cited

U.S. PATENT DOCUMENTS

2018/0041685 A1* 2/2018 Carbonell ................ G06T 7/33
2018/0249295 A1* 8/2018 Moraru ................ H04W 4/024

* cited by examiner

300

350

GEOFENCED MESH NETWORK COMMUNICATION

CROSS-REFERENCE TO RELATED APPLICATION

This application is a continuation of U.S. patent application Ser. No. 16/559,294, filed Sep. 3, 2019, and titled "GEOFENCED MESH NETWORK COMMUNICATION", which is a divisional of and claims priority to U.S. patent application Ser. No. 16/149,358, filed Oct. 2, 2018, and titled "GEOFENCED MESH NETWORK COMMUNICATION," which are incorporated herein by reference in their entirety.

TECHNICAL FIELD

The disclosed technology relates generally to communicating information, and in particular to technology for geofencing mesh network communication.

BACKGROUND

In some instances, it may be necessary to communicate information to persons within a particular location. For instance, an emergency may occur at a location and it may be necessary to communicate information about the emergency to persons near the emergency location or locations affected by the emergency. However, regular means of communication, such as cellular service or Internet, may not be available or congested during the emergency.

BRIEF SUMMARY OF EMBODIMENTS

One aspect of the present disclosure is directed to a system for communicating information within a geofence. The system may comprise a mesh network including a source node and one or more non-source nodes, the one or more non-source nodes including a first non-source node, the source node and the one or more non-source nodes individually comprising a memory and a processor; the source node located at a source location, the source node configured to perform: generating geofenced message information, the geofenced message information defining a geofenced message for one or more non-source nodes within the geofence; and transmitting the geofenced message information for reception by one or more non-source nodes within a communication range of the source node, the one or more non-source nodes within the communication range of the source node including the first non-source node; and the first non-source node located at a first location, the first-non-source node configured to perform: receiving the geofenced message information; and responsive to receiving the geofenced message information: transmitting the geofenced message information for reception by one or more non-source nodes within a communication range of the first non-source node; determining whether the first location of the first non-source node is within the geofence; responsive to determining that the first location of the first non-source node is within the geofence, presenting the geofenced message; and responsive to determining that the first location of the first non-source node is not within the geofence, not presenting the geofenced message.

Another aspect of the present disclosure is directed to another system for communicating information within a geofence. The system may comprise a memory and one or more processors. The memory may store instructions that, when executed by the processor(s), may cause the system to perform: receiving geofenced message information, the geofenced message information defining a geofenced message for one or more non-source nodes within the geofence; and responsive to receiving the geofenced message information: transmitting the geofenced message information for reception by one or more non-source nodes within a communication range of the system; determining whether a location of the system is within the geofence; responsive to determining that the location of the system is within the geofence, presenting the geofenced message; and responsive to determining that the location of the system is not within the geofence, not presenting the geofenced message.

Another aspect of the present disclosure is directed to another system for communicating information within a geofence. The system may comprise a memory and one or more processors. The memory may store instructions that, when executed by the processor(s), may cause the system to perform: generating geofenced message information, the geofenced message information defining a geofenced message for one or more non-source nodes within the geofence; and transmitting the geofenced message information for reception by one or more non-source nodes within a communication range of the system, the one or more non-source nodes within the communication range of the system including a first non-source node located at a first location; wherein the first non-source node, responsive to receiving the geofenced message information, performs: transmitting the geofenced message information for reception by one or more non-source nodes within a communication range of the first non-source node; determining whether the first location of the first non-source node is within the geofence; responsive to determining that the first location of the first non-source node is within the geofence, presenting the geofenced message; and responsive to determining that the first location of the first non-source node is not within the geofence, not presenting the geofenced message.

In some embodiments, the geofence may define a two-dimensional boundary. In some embodiments, the geofence may define a three-dimensional boundary.

In some embodiments, whether the first location of the first non-source node is within the geofence may be determined based on at least a portion of the geofenced message information. The portion of the geofenced message information may define a source location of the system and a geofence range from the source location. The portion of the geofenced message information may define a boundary of the geofence. The portion of the geofenced message information may define a limit on a number of hops for the geofenced message information transmission. The portion of the geofenced message information may further define a time of transmission of the geofenced message information by the system. The portion of the geofenced message information may define the communication range of the system.

In some embodiments, the first non-source node may be further configured to perform modifying the geofenced message information before transmitting the geofenced message information.

In some embodiments, transmission of the geofenced message information by the first non-source node may be limited to a maximum transmission number.

In some embodiments, transmission of the geofenced message information by the first non-source node may be limited based on proximity of the first location of the first non-source node to the geofence.

In some embodiments, the one or more non-source nodes may further include a second non-source node located at a second location. The first location of the first non-source node may not be within the geofence. The second location of the second non-source node may be within the geofence. The second non-source node may receive the geofenced message information from the first non-source node.

In some embodiments, the first non-source node may be included within a sensor device. The sensor device may include a smoke detector, a carbon monoxide detector, or a motion detector. The sensor device may be configured to perform categorizing the geofenced message. A priority of the geofenced message may be determined or changed based on the categorization of the geofenced messaged. The sensor device may be configured to perform communicating with a server responsive to receiving the geofenced message information.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Figure 1:
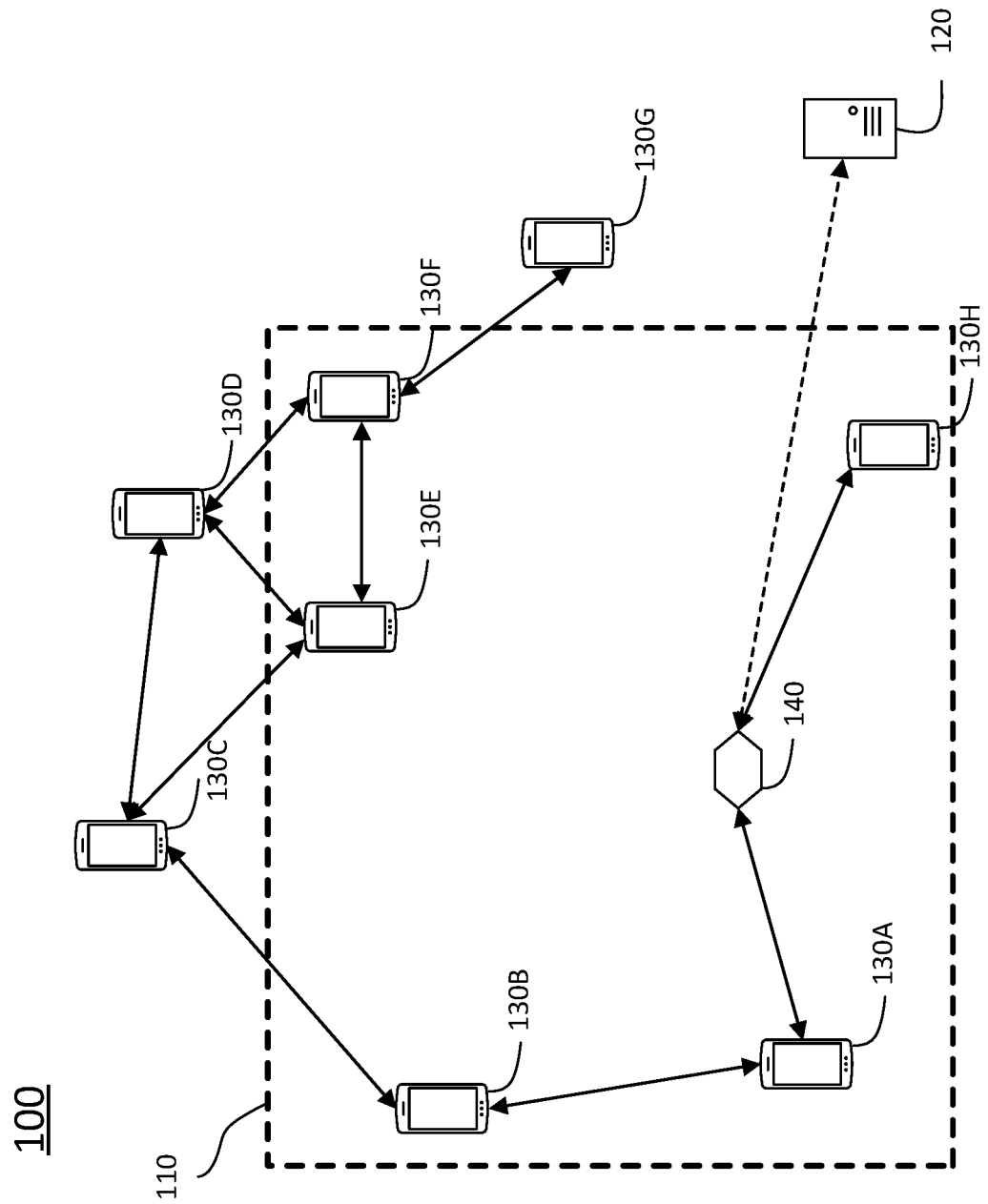
FIG. 1 illustrates an example environment in which one or more embodiments in accordance with the technology of the present disclosure may be implemented.

FIG. 1 illustrates an example environment 100 in which one or more embodiments of the technology disclosed herein may be implemented. The environment 100 may include multiple computing devices (e.g., a server 120, user devices 130A, 130B, 130C, 130D, 130E, 130F, 130G, 130H, a sensor device 140) and/or other components. Two or more components of the environment 100 may be communicatively connected to each other. Connections between the components may form a mesh network, with individual components operating as a node within the mesh network. A node within the mesh network may refer to a connection point that can receive, generate, store, and/or transmit information along one or more network routes. One or more of the computing devices of the environment 100 may be used to communicate information within a geofence 110. The geofence 110 may refer to a virtual boundary. A computing device that generates and transmits information to be communicated within the geofence 110 may be referred to as a source node. For example, a source node may generate and transmit geofenced message information. The geofence message may define a geofenced message for non-source nodes within the geofence 110. A computing device that receives and transmits information (relays information) may be referred to as a non-source node. For example, responsive to receiving the geofenced message information, a non-source node may (1) transmit the geofenced message information for reception by one or more other non-source nodes within a communication range of the non-source node, and (2) determine whether the location of the non-source node is within the geofence 110. Responsive to determining that the location of the non-source node is within the geofence 110, the non-source node may present the geofenced message. Responsive to determining that the location of the non-source node is not within the geofence 110, the non-source node may not present the geofenced message.

For instance, the user devices 130A, 130B, 130C, 130D, 130E, 130F, 130G, 130H and the sensor device 140 may operate as nodes within a mesh network. The user device 130A may operate as a source node, and one or more of the user devices 130B, 130C, 130D, 130E, 130F, 130G, 130H and the sensor device 140 may operate as non-source nodes. The nodes of the mesh network may be located at different locations within the environment 100. The location of the user device 130A within the environment 100 may be referred to as a source location.

The user device 130A (operating as a source node) may generate geofenced message information. The geofenced message information may define a geofenced message for one or more non-source nodes within the geofence 110. The user device 130A may transmit the geofenced message information for reception by non-source node(s) within a communication range of the user device 130A. The communication range of the user device 130A may refer to distances within which information transmitted by the user device 130A may be received. For example, the communication range of the user device 130A may include the user device 130B and the sensor device 140, and the geofenced message information transmitted by the user device 130A may be received by the user device 130B and the sensor device 140.

The non-source devices that receive the geofenced message information may relay the geofenced message information to other non-source devices. For example, the sensor device 140 may receive the geofenced message information from the user device 130A, and may transmit the geofenced message information to non-source node(s) within the communication range of the sensor device 140, such as the user device 130H. The user device 130B may receive the geofenced message information from the user device 130A, and may transmit the geofenced message information to non-source node(s) within the communication range of the user device 130B, such as the user device 130C. The user device 130C may in turn transmit the geofenced message information to the user devices 130D, 130E. The user device 130D may transmit the geofenced message information to the user devices 130E, 130F, and the user device 130E may transmit the geofenced message information to the user devices 130D, 130F. The user device 130F may transmit the geofenced message information to the user device 130G. The geofenced message information transmitted by a non-source node may be received by a node that transmitted the geofenced message information. For example, the geofenced message information transmitted by the user device 130B may be received by the user device 130A and the geofenced message information transmitted by the user device 130G may be received by the user device 130F.

Individual non-source devices that receive the geofenced message information may determine whether the location of the non-source device is within the geofence 110. Responsive to determining that the location of the non-source node is within the geofence 110, the non-source node may visually and/or audibly present the geofenced message. Responsive to determining that the location of the non-source node is not within the geofence 110, the non-source node may not present the geofenced message. For example, the user devices 130B, 130E, 130F, 130H may individually determine that its location is within the geofence 110, and may present the geofenced message to its users through one or more displays and/or one or more speakers of the user devices 130B, 130E, 130F, 130H. The user devices 130C, 130D, 130G may determine that its location is not within the geofence 110, and may not present the geofenced message to its users.

Having thus described an example environment in which the disclosed technology can be implemented, various features and embodiments of the disclosed technology are now described in further detail. After reading the description herein, it will become apparent to one of ordinary skill in the art that the disclosed technology can be implemented in any of a number of different environments.

A computing device within the environment 100 may refer to a machine for performing one or more calculations, such as a computer, a data processor, an information processing system, and/or other computing device. A computing device may include a mobile device, such as a laptop, a tablet, a smartphone, a smartwatch, smart glasses, a smart wear, a PDA, and/or other mobile device. A computing device may include a non-mobile device, such as a desktop computer and/or other non-mobile device. A computing device may include one or more processors, memory, and/or other components. The processor(s) may include one or more physical processors and/or one or more virtual processors. The processor(s) may be configured by software, firmware, and/or hardware to perform one or more functions described herein. Memory may include permanent memory and/or non-permanent memory. Memory may store one or more instructions, which may be executed by the processor(s). The execution of the instruction(s) by the processor(s) may cause the computing device to perform one or more functionalities described herein. A computing device may include and/or be coupled with other components, such as interface components, to perform its functions.

The computing devices (e.g., the user devices 130A, 130B, 130C, 130D, 130E, 130F, 130G, 130H, the sensor device 140) within the mesh network may communicate using one or more communication protocols. Some non-limiting examples of communication protocols over which the computing devices may communicate may include: cellular telecommunications protocols, such as GSM, UMTS, CDMA2000, LTE, or WiMAX; wired communication methods, such as cable, DSL, dial-up, or fiber-optic; and/or wireless communication methods, such as satellite communications, Wi-Fi, Bluetooth, or near-field communication (NFC). Usage of other communication protocols are contemplated.

The environment 100 may also include one or more datastores and/or one or more databases that are accessible to one or more computing devices. The database(s) and/or datastore(s) may be stored within one or more memories of the computing devices, stored in one or more memories of devices coupled to a computing device, and/or may be accessible via one or more networks, such as the network(s) 150.

While the user devices 130A, 130B, 130C, 130D, 130E, 130F, 130G, 130H are illustrated in FIG. 1 as mobile devices, this is merely as an example and is not meant to be limiting. The user devices may include other computing devices. While various computing devices (e.g., the server 120, the user devices 130A, 130B, 130C, 130D, 130E, 130F, 130G, 130H, the sensor device 140) are shown in FIG. 1 as single entities, this is merely for ease of reference and is not meant to be limiting. One or more components/functionalities of a computing device described herein may be implemented, in whole or in part, within a single computing device or within multiple computing devices. For example, the sensor device 140 may refer to a single sensor device, multiple sensor devices that are physically co-located, and/or multiple sensor devices that are located in different physical locations.

While the disclosure is described herein with respect to communicating information relating to emergencies, this is merely for illustrative purposes and is not meant to be limiting. The approach disclosed herein may be used to communicate other types of information.

A portion of the environment 100 may be bounded by the geofence 110. The geofence 110 may refer to a virtual boundary. The geofence 110 may define a two-dimensional boundary or a three-dimensional boundary. The virtual boundary of the geofence 110 may be related or unrelated to geographic features within the environment 100. The geofence 110 may define a static boundary that does not change. The geofence 110 may define a dynamic boundary that changes based on changes in time, changes in conditions, and/or changes in other criteria. While the geofence 110 is shown to define a rectangular boundary, this is merely as an example and is not meant to be limiting. Other shapes of geofence are contemplated.

The shape and/or sizes of the geofence 100 may be determined based on one or more of a user input, a user account, an organization associated with a user, a user location, a geofenced message, remotely received information, and/or other information. For example, a user may interact with the user device 130A to generate a geofenced message for user devices within the geofence 110. The user may interact with the user device 130A to define the shape and/or size of the geofence 110. For example, the user device 130A may display a map of the environment 100 on a display and the user may draw and/or select the boundary of the geofence by interacting with the display (e.g., touchscreen display) and/or other interface device(s) of the user device 130A. The user account of the user of the user device 130A may be associated with the shape and/or size of the geofence 110 as a default and/or as a potential geofence shape/size available for selection by the user. An organization associated with the user of the user device 130 may be associated with the shape and/or size of the geofence 110 as a default and/or as a potential geofence shape/size available for selection by the user. The location of the user device 130A may be associated with the shape and/or size of the geofence 110 as a default and/or as a potential geofence shape/size available for selection by the user. The type and/or content of the message to be transmitted as the geofenced message (e.g., emergency message relating to fire, notification regarding a change to an upcoming event) may be associated with the shape and/or size of the geofence 110 as a default and/or as a potential geofence shape/size available for selection by the user. Remotely received information may be associated with the shape and/or size of the geofence 110 as a default and/or as a potential geofence shape/size available for selection by the user. For instance, the user device 130A may receive information relating to shape and/or size of the geofence 110 from the server 120. Other determinations of the shape and/or sizes of the geofence 110 are contemplated.

The environment 100 may include user devices 130A, 130B, 130C, 130D, 130E, 130F, 130G, 130H and the sensor device 140 positioned at different locations. The user devices 130A, 130B, 130E, 130F, 130H and the sensor device 140 may be located within the geofence 110. The user devices 130C, 130D, 130G may not be located within the geofence 110. A user device may refer to a computing devices associated with (e.g., used by, owned by, registered to) one or more users. A user device may include one or more displays (e.g., touchscreen-display, non-touchscreen display), one or more speakers, one or more microphones, and/or one or more interface devices (e.g., physical/virtual keyboard and/or mouse). A user device may include one or more transceivers and/or other communication components designed to connect the user device to a network, such as a mesh network, cellular network, the Internet, or other networks.

Two or more of the user devices 130A, 130B, 130C, 130D, 130E, 130F, 130G, 130H and the sensor device 140 may be communicatively connected. Connections between two or more of the user devices 130A, 130B, 130C, 130D, 130E, 130F, 130G, 130H and the sensor device 140 may include wireless connection(s) and/or wired connection(s). Connections between two or more of the user devices 130A, 130B, 130C, 130D, 130E, 130F, 130G, 130H and the sensor device 140 may form a mesh network, with individual devices operating as a node within the mesh network. The mesh network may include a wireless mesh network, a wired mesh network, or a mesh network including both wireless connection(s) and wired connection(s).

A node within the mesh network may refer to a connection point that can receive, generate, store, and/or transmit information along one or more network routes. One or more of the user devices 130A, 130B, 130C, 130D, 130E, 130F, 130G, 130H and the sensor device 140 may be used to communicate information within a geofence 110. A node that generates and transmits information to be communicated within the geofence 110 may be referred to as a source node. The location of the source node may be referred to as a source location. A node that receives and transmits information (relays information) to other nodes may be referred to as a non-source node.

Use of the user devices 130A, 130B, 130C, 130D, 130E, 130F, 130G, 130H as nodes within the mesh network may provide additional and/or alternative method of communication among the user devices 130A, 130B, 130C, 130D, 130E, 130F, 130G, 130H. The user devices 130A, 130B, 130C, 130D, 130E, 130F, 130G, 130H may be connected to communication network(s), such as a cellular network or the Internet, and may use such communication network(s) to communicate information to other user devices, to the server 120, and/or to other computing devices. However, such communication network(s) may become unavailable or congested, such as due to the communication network(s) equipment being down or in an emergency when the communication network becomes congested due to many users attempting to use the communication network. In such a situation, relying on such communication network(s) to provide information may result in delay or failed communication. Rather than relying on such communication network(s), the user devices 130A, 130B, 130C, 130D, 130E, 130F, 130G, 130H may use the mesh network to communicate information. The mesh network may rely on proximity of the user devices using wireless communication and/or physical connection of the user devices using wired communication, rather than relying on connection with a remote device (e.g., server, cellular tower), to communicate information. Such method of communication may be more reliable and/or faster than using cellular network or connection to the Internet.

A sensor device may refer to a device designed to detect events or changes in its environment. A sensor device may measure (e.g., ascertain, detect, estimate) one or more physical properties. A sensor device may record, indicate, and/or otherwise respond to the measured physical propert(ies). For example, the sensor device 140 may include one or more of a smoke detector, a carbon monoxide detector, and/or a motion detector. A sensor device may also include one or more transceivers and/or other communication components designed to connect the sensor device to a network, such as a mesh network, cellular network, the Internet, or other networks. For example, the sensor device 140 may operate as a node within the mesh network including the user devices 130A, 130B, 130C, 130D, 130E, 130F, 130G, 130H. Use of such sensor devices may extend the range/extent of the mesh network. For example, the user device 130A may be communicating wirelessly, with the user device 130B within the range of communication of the user device 130A and the user device 130H outside the range of communication of the user device 130A. The sensor device 140 may operate as a non-source node that receives information from the user device 130A and transmits the information to the user device 130H, and thus increase the size of the mesh network.

The sensor device 140 may provide artificial intelligence analysis of information communicated within a network. For example, the user devices 130A, 130B, 130C, 130D, 130E, 130F, 130G, 130H within the mesh network may communicate geofenced message information defining a geofenced message, and the sensor device 140 may be configured to analysis and/or categorize the geofenced message. The analysis and/or categorization of the geofenced message may be used to provide additional information for transmission within the mesh network, to determine or change the priority of the geofenced message (e.g., increase the priority of more urgent geofenced message), and/or otherwise supplement the communication of the geofenced message.

It may be desirable to communicate information relating to the geofenced message to a remote device, such as the server 120. For example, if the geofenced message includes information relating to an emergency, it may be desirable to communicate information about the emergency to the server 120 for relaying of the information to appropriate persons and/or organizations (e.g., police department, fire department, emergency service, hospital). However, if the connection to a cellular network or the Internet is down or congested, using the user devices 130A, 130B, 130C, 130D, 130E, 130F, 130G, 130H to attempt to communicate with the server 120 may result in drainage of the battery of the user devices 130A, 130B, 130C, 130D, 130E, 130F, 130G, 130H without successful communication with the remote device, in addition to greater congestion of the network.

The sensor device 140 may be configured to communicate with a remote device, such as the server 120. For example, responsive to receiving the geofenced message information from the user device 130A, the sensor device 140 may communicate or attempt to communicate with the server 120 regarding the geofenced message information. The sensor device 140 may have more power available than the user devices 130A, 130B, 130C, 130D, 130E, 130F, 130G, 130H (e.g., have a larger battery, wired to a power generator). Use of the sensor device 140 to communicate information to a device outside the mesh network may enable the user devices 130A, 130B, 130C, 130D, 130E, 130F, 130G, 130H to conserve power and processing resources, while reducing the amount of congestion of the network through which communication with the server 120 is established.

To further illustrate the operation of the devices within the mesh network, an example scenario is provided below. In the example scenario, the user device 130A may generate and transmit a geofenced message. The user device 130A may operate as a source node within the mesh network, with the location of the user device referred to as a source location. The user device 130A may generate geofenced message information defining a geofenced message for one or more non-source nodes within the geofence 110. That is, the user device 130A may generate information defining a message to be shared with nodes of the mesh network within the geofence 110. The user device 130A may transmit the geofenced message information for reception by one or more non-source nodes within a communication range of the user device 130A. That is, the user device 130A may transmit the geofenced message information for reception by any non-source nodes within its communication range, such as the user device 130B and the sensor device 140.

The user device 130A may generate geofenced message information based on user interaction with the user device 130A and/or based on communication with other device(s). For example, the user of the user device 130A may interact with the user device 130A to specify the geofenced message and the shape and/or size of the geofence 110. As another example, the user device may receive commands from another device (e.g., the server 120) to generate geofenced information to distribute geofenced message within the geofenced 110. For instance, a remote user or a remote computing device may send one or more commands (e.g., via the server 120) to the user device 130A to generate geofenced message information for devices within the geofence 110.

The capability of the user device 130A to generate geofenced message information may be limited based the user of the user device 130A and/or the location of the user device 130A. For example, the user of the user device 130A may be associated with a permission to generate geofenced message information for particular shapes and/or sizes of geofences, but not all shapes and/or sizes of geofences. For instance, the user of the user device 130A may belong to an organization and the organization may limit the shape and/or sizes of geofences that may be generated by the user device and/or the user device 130A. As another example, the user of the user device 130A may be associated with a permission to generate geofenced message information based on location of the user device 130A. For instance, the user device 130A may required to be within or proximate (e.g., within a threshold distance) to the geofence 110 to generate geofenced message information for the geofenced 110. Restricting generation of the geofenced message information to devices within or proximate to the corresponding geofence may decrease the likelihood of users abusing use of geofenced messages (e.g., prank messages). Different classes of users may be associated with different permissions for generating geofenced message information. For example, the lowest class of users may be restricted to generating geofenced message information for particular shapes and/or sizes of geofences while the user/the user device is within or proximate to the geofence, while the highest class of users may have permission to generate geofenced message information for any shapes and/or sizes of geofences and may not be restricted based on location of the user/the user device.

The geofenced message information may include a message portion, a geofence portion, and/or other portions. The message portion of the geofenced message information may define a geofenced message for one or more non-source nodes within the geofence 110. The geofence portion of the geofenced message information may define information which may be used by non-source node(s) to determine whether the non-source node(s) are within the geofence 110. For example, the geofenced portion of the geofenced message information may define the source location of the user device 130A and a geofence range from the source location. The geofence range from the source location may be used to identify the boundary of the geofence 110. The geofence range may identify distance(s) and/or direction(s) from the source location of the user device 130A at which the boundary of the geofence 110 is located. As another example, the geofenced portion of the geofenced message information may define the boundary of the geofence 110. That is, the geofenced portion of the geofenced message information may provide values that correspond to the boundary location of the geofence 110. As yet another example, the geofenced portion of the geofenced message information may define a limit on a number of hops for the geofenced message information transmission. That is, the geofenced portion of the geofenced message information may provide for a limit on how many times the geofenced message information may be transmitted by the nodes of the mesh network before the geofenced message information is considered to be outside the geofenced 110. The geofenced portion of the geofenced message information may further define a time of transmission of the geofenced message information by the user device 130A. The time of the transmission of the geofenced message information by the user device 130A may be used with the hopping of the geofenced message information to determine when the geofenced message information is considered to be outside the geofenced 110. As yet another example, the geofenced portion of the geofenced message information may define the communication range of one or more nodes within the mesh network. The communication range of the node(s) may be used with the hopping of the geofenced message information to determine when the geofenced message information is considered to be outside the geofenced 110.

The user devices 130B, 130C, 130D, 130E, 130F, 130G, 130H, and the sensor device 140 (non-source nodes) may be located at different location within the environment 100. The non-source nodes may be configured to receive geofenced message information transmitted within the mesh network. The non-source nodes may receive the geofenced message information when they are within the communication range of the node that transmitted the geofenced message information. For example, the user device 130B and the sensor device 140 may receive the geofenced message information transmitted by the user device 130A.

A non-source node may, responsive to receiving the geofenced message information, transmit the geofenced message information for reception by one or more non-source nodes within a communication range of the non-source node. For example, the user device 130B may, responsive to receiving the geofenced message information from the user device 130A, transmit the geofenced message information for reception by one or more non-source nodes (the user device 130C) within a communication range of the user device 130B. As another example, the sensor device 140 may, responsive to receiving the geofenced message information from the user device 130A, transmit the geofenced message information for reception by one or more non-source nodes (the user device 130H) within a communication range of the sensor device 140. The geofenced message information transmitted by the user device 130B and/or the sensor device 140 may also be received by the user device 130A. Such transmission of the geofenced message information may distribute the geofenced message information among the user devices 130B, 130C, 130D, 130E, 130F, 130G, 130H, and the sensor device 140.

A non-source device may modify the geofenced message information before transmitting the geofenced message information. For example, if the geofenced portion of the geofenced message information may define a limit on a number of hops for the geofenced message information transmission, the non-source device may change the limit (e.g., reduce the limit value by one) or otherwise change the geofenced portion of the geofenced message information to indicate that another hop has been/will be performed. Other modifications of the geofenced message information are contemplated.

The transmission of the geofenced message information by a non-source node may be limited to a maximum transmission number. For example, the user device 130B may be limited to transmitting a particular geofenced message information a set number of times to prevent the geofenced message information from being exchanged continually. The limit on the maximum transmission number may be overridden based on movement of the non-source node. For example, after having transmitted the geofenced message information the set number of times, the user device 130B may move to another location within and/or proximate to the geofence 110. The new location of the user device 130B may enable the user device 130B to communicate with one or more new non-source nodes, and it may be beneficial to allow the user device 130B to communicate the geofenced message information past the set number of times. The override of the set number of times of transmission based on the movement of the non-source node may require the movement of the non-source node a certain amount of distance, to a certain location within or proximate to the geofence 110, to a certain location in relation to other locations of the nodes within the mesh network, and/or other location movement criteria.

The transmission of the geofenced message information by a non-source node may be limited based on proximity of the location of the non-source node to the geofence 110. That is, whether the non-source node transmits the geofenced message based on reception of the geofenced message may depend on where the non-source node is located with respect to the geofence 110. For example, based on the user device 130B being located within the geofence 110, the user device 130B may be allowed to transmit the geofenced message information responsive to receiving the geofenced message information from the user device 130A and/or the user device 130C. Based on the user device 130C being located outside the geofence 110, the user device 130C may be allowed to transmit the geofenced message information a set number of times or a fewer number of times than the user device 130B. For instance, the user device 130B may be allowed to transmit the geofenced message information four times while the user device 130C may be allowed to transmit the geofenced message information two times. The number of times a node is allowed to transmit the geofenced message information may change based on relative location of the node with respect to the geofence 110 (e.g., further away from the geofence 110, fewer number of transmission allowed). Other permitted numbers of transmission are contemplated.

The transmission of the geofenced message information by a non-source node may be limited based the duration between reception and transmission of the geofenced message information. For example, the user device 130B may be located within the geofence 110 when it receives the geofenced message information. Prior to transmission of the geofenced message information by the user device 130B, the user device 130B may be moved out of the geofence 110. In such as case, it may be desirable for the user device 130B to not transmit the geofenced message information. Whether the transmission of the geofenced message information by a non-source node is canceled based on the movement of the non-source node may depend on the initial location of the non-source node, the location to which the non-source node moved, and/or the location of the geofence 110.

A non-source node may, responsive to receiving the geofenced message information, determine whether its location is within the geofence 110. For example, the user devices 130B, 130E, 130F, 130H may individually determine that they are located within the geofence 110. The user devices 130C, 130D, 130G may individually determine that they are not located within the geofence 110.

A non-source node may, responsive to determining that the its location is within the geofence 110, presenting the geofenced message defined by the geofenced message information. For example, the user devices 130B, 130E, 130F, 130H may determine that they are located within the geofence 110 and may present the geofenced message defined by the geofenced message information. The geofenced message may be presented via one or more displays and/or one or more speakers of the non-source node. The sensor device 140 may also include one or more display and/or one or more speakers. The sensor device may, responsive to receiving the geofenced message information, determine that its location is within the geofence 110 and present the geofenced message using its display(s) and/or speaker(s).

A non-source node may, responsive to determining that the its location is not within the geofence 110, not present the geofenced message defined by the geofenced message information. For example, the user devices 130C, 130D, 130G may determine that they are not located within the geofence 110 and may not present the geofenced message defined by the geofenced message information. The user devices 130C, 130D, 130G may not process the geofenced message information for presentation based on their location outside the geofence 110. The user devices 130C, 130D, 130G may not process the message portion of the geofenced message information based on their location outside the geofence 110.

A non-source node may determine whether its location is within the geofence 110 based on at least a portion of the geofenced message information and/or other information. For example, the non-source node may determine the boundary of the geofence 110 based on the geofence portion of the geofenced message information and may determine whether the non-source node is within the boundary of the geofence 110. For instance, the non-source node may determine the boundary of the geofence 110 based on the geofence portion of the geofenced message information defining the source location of the user device 130A and the geofence range from the source location. The non-source node may determine the boundary of the geofence 110 based on the geofence portion of the geofenced message information provide values that correspond to the boundary location of the geofence 110.

The non-source node may determine whether its location is within the determined boundary of the geofence 110 based on information provided by a global positioning system (GPS), information provided by one or more beacons, and/or other information. Even without cellular service and/or Internet connectivity, the non-source node may determine its location via GPS (communication with satellites). Based on GPS-determined location, the non-source node may determine whether its location is within the boundary of the geofence 110. Alternatively and/or in addition, one or more beacons (e.g., Bluetooth low energy beacons) may mark the boundary of the geofence 110 and the geofence portion of the geofenced message information provide values corresponding to the beacons and/or for use with information provided by the beacons. Based on information received from the beacons, the non-source node may determine whether its location is within the boundary of the geofence 110. For example, the non-source device may use triangulation from information received by multiple beacons to determine whether its location is within the boundary of the geofence 110.

The non-source node may determine the boundary of the geofence 110 based on the geofence portion of the geofenced message information defining a limit on a number of hops for the geofenced message information transmission. That is, the non-source node may determine whether its location is within the determined boundary of the geofence 110 based on how many times the geofenced message has been transmitted from node to node and the limit on the number of hops for the geofenced message information transmission. For example, the geofence portion of the geofenced message information may set a maximum number the geofenced message information may be transmitted and the non-source node may determine whether it is within the boundary of the geofence 110 based on the hop number of the geofenced message not exceeding the maximum number.

The non-source node may determine whether it is within the boundary of the geofence 110 based on a combination of hop number and transmission time of the geofenced message information by the user device 130A. For example, a certain number of hops within a short duration of time after transmission of the geofenced message information by the user device 130A may lead the non-source node to determine that it is within the geofence 110 while the same number of hops within a long duration of time after transmission of the geofenced message information by the user device 130A may lead the non-source node to determine that it is outside the geofence 110.

The non-source node may determine whether it is within the boundary of the geofence 110 based on a combination of hop number and communication range of the node(s). For example, a certain number of hops by nodes with a certain communication range may lead the non-source node to determine that it is within the geofence 110 while the same number of hops by nodes with a longer communication range may lead the non-source node to determine that it is outside the geofence 110.

The transmission of the geofenced message information by the user device 130A may result in the user devices 130B, 130C, 130D, 130E, 130F, 130G, 130H receiving and transmitting the geofenced message information, the user devices 130B, 130E, 130F, 130H within the geofence 110 presenting the geofenced message defined by the geofenced message information, and the user devices 130C, 130D, 130G outside the geofence 110 not presenting the geofenced message defined by the geofenced message information. The geofenced message information may be distributed by nodes of the mesh network both inside and outside the geofence 110, with only the nodes inside the geofence 110 presenting the geofenced message. Such separation of the transmission and presentation of the geofenced message enables the mesh network to cover a greater area and provide the geofenced message to greater number of computing devices within the geofence 110. For example, the user devices 130E, 130F are within the geofence 110, and yet are not within the communication range of the user devices 130A, 130B, 130H or the sensor device 140. Allowing the geofenced message information to be transmitted outside the geofence 110 enables the user devices 130E, 130F to receive the geofenced message information from the user devices 130C and/or the user device 130D (nodes that are not allowed to present the geofenced message). Thus, the nodes outside the geofence 110 are used as relay nodes that transmits but does not present the geofenced message.

Figure 2:
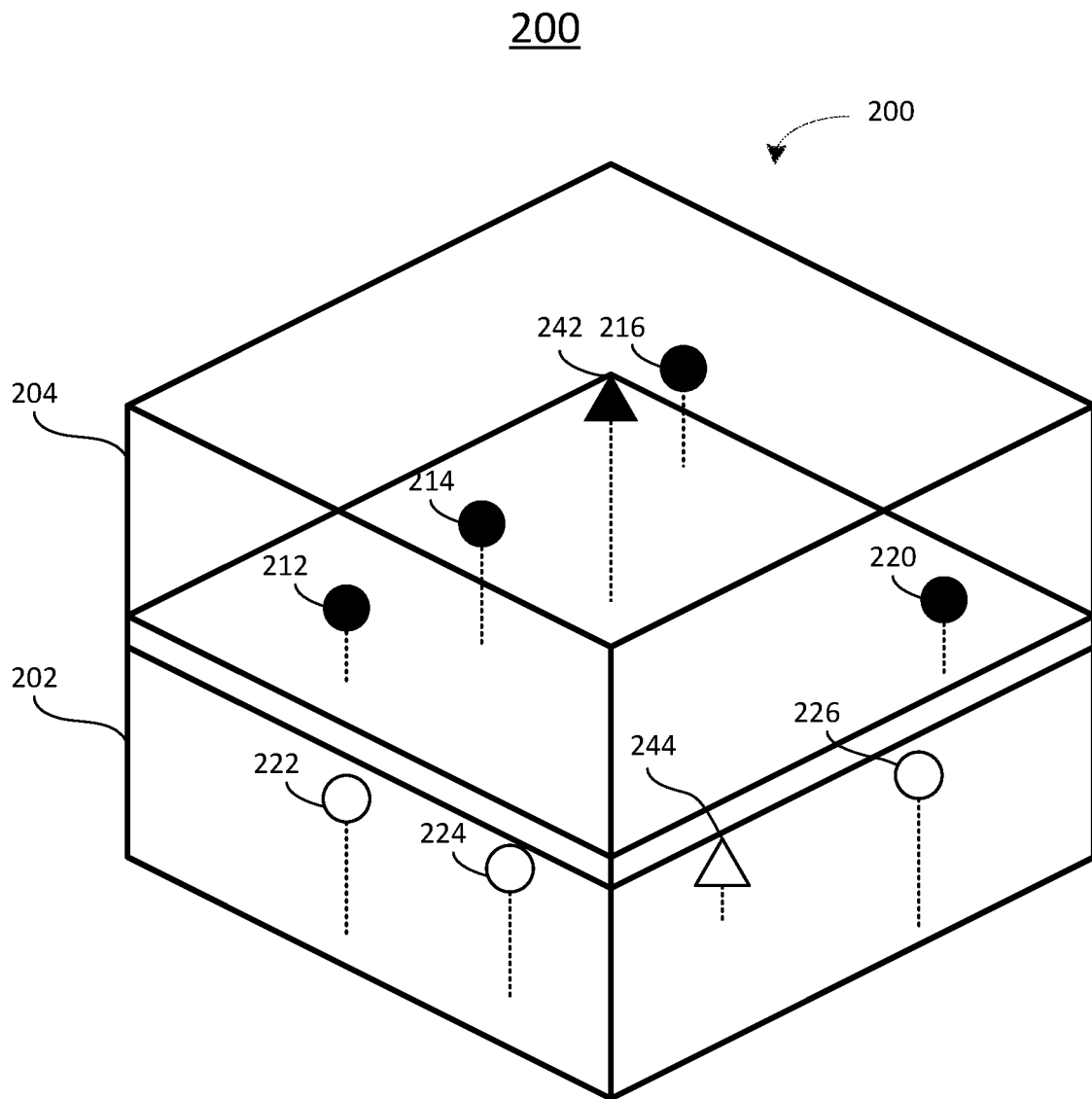
FIG. 2 illustrates an example environment in which one or more embodiments in accordance with the technology of the present disclosure may be implemented.

FIG. 2 illustrates an example environment 200 in which one or more embodiments in accordance with the technology of the present disclosure may be implemented. The environment 200 includes a building 202 with a first floor 204 and a second floor 204. User devices 212, 214, 216, 218, 220 and a sensor device 242 may be located on the second floor 204. User devices 222, 224, 226 and a sensor device 244 may be located on the first floor 202. The connection among the user devices 212, 214, 216, 222, 224, 226, and the sensor devices 242, 244 may form a mesh network. The user devices 212, 214, 216, 222, 224, 226, and the sensor devices 242, 244 may operate as nodes within the mesh network.

The user device 216 may generate and transmit geofenced message information defining a geofenced message for nodes within the second floor 204. The communication range of the user device 216, however, may only cover the sensor device 242, and the geofenced message information transmitted by the user device 216 may not reach the user devices 212, 214, 220. The sensor device 242 may have the same or different communication range than the user device 216. For example, the communication range of the sensor device 242 may be greater than the communication range of the user device 216. The communication range of the sensor device 242 may cover the user devices 212, 214, but not cover the user device 220. The geofenced message information transmitted by the user device 216 may be relayed within the mesh network as follows: the geofenced message information may be received by the sensor device 242; the sensor device 242 may transmit the geofenced message information to the user devices 212, 214; the user device 212 may transmit the geofenced message information to the user device 222; the user device 222 may transmit the geofenced message information to the user device 224; the user device 224 may transmit the geofenced message information to the sensor device 244; the sensor device 244 may transmit the geofenced message information to the user device 226; the user device 226 may transmit the geofenced message information to the user device 220.

The nodes of the mesh network may present the geofenced message based on its location within the second floor 204, and may not present the geofenced message based on its location within the first floor 202. The user devices 222, 224, 226 and the sensor device 244 may operate as relay nodes to provide the geofenced message information to the user device 220 while not presenting the geofenced message defined by the geofenced message information. The sensor devices 242, 244 may communicate and/or attempt to communicate information relating to the geofenced message to a remote device, such as the server, through a non-mesh network, such as a cellular network or the Internet.

Figure 3A:
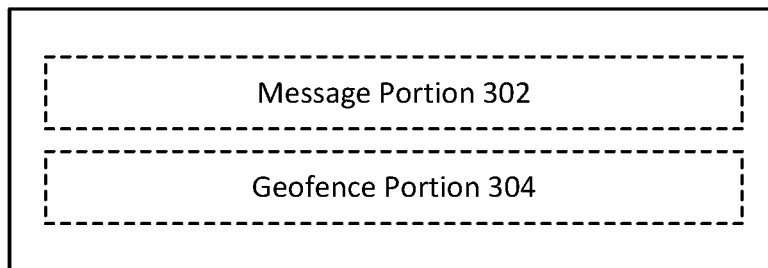
FIG. 3A illustrates example portions of geofenced message information in accordance with one or more embodiments of the technology disclosed herein.

FIG. 3A illustrates example portions of geofenced message information 300 in accordance with one or more embodiments of the technology disclosed herein. The geofenced message information 300 may include a message portion 302, a geofence portion 304, and/or other portions. The message portion 302 of the geofenced message information 300 may define one or more geofenced messages for one or more nodes within a geofence. The geofenced portion 304 of the geofenced message information 300 may define information which may be used by node(s) to determine whether the node(s) are within the geofence 110.

Figure 3B:
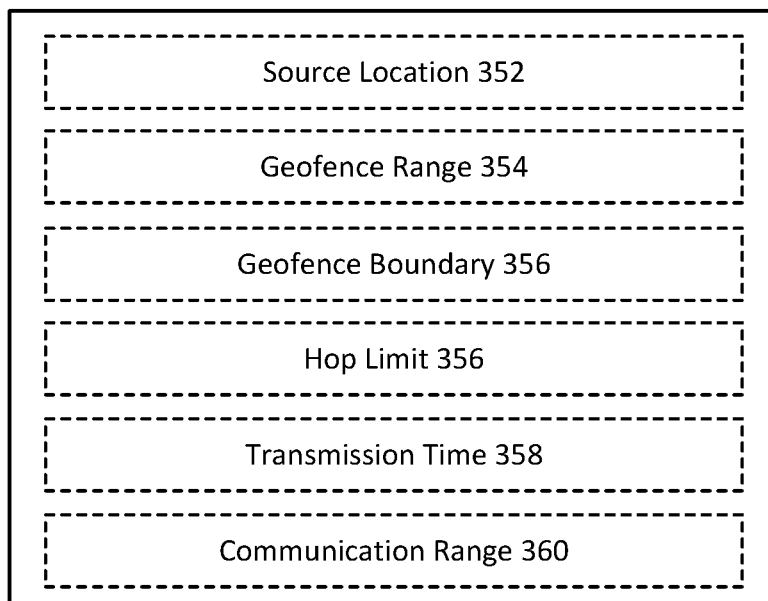
FIG. 3B illustrates example information within a geofenced portion of geofenced message information in accordance with one or more embodiments of the technology disclosed herein.

FIG. 3B illustrates example information within a geofenced portion 350 of geofenced message information 350 in accordance with one or more embodiments of the technology disclosed herein. The geofenced portion 350 may define one or more of a source location 352 of a source node, a geofence range 354 from the source location, a geofence boundary 356, a hop limit 356, a transmission time 358 of the geofenced message information by a source node, a communication range of one or more nodes within a mesh network, and/or other information.

The geofence range 354 from the source location 352 may be used to identify the boundary of the geofence. The geofence boundary 356 may provide values that correspond to the boundary location of the geofence. The hop limit 356 may provide for a limit on how many times geofenced message information may be transmitted by nodes of a mesh network before the geofenced message information is considered to be outside the geofenced. The transmission time 358 of the geofenced message information by the source node may be used with the hopping of the geofenced message information to determine when the geofenced message information is considered to be outside the geofenced. The communication range 360 of the node(s) may be used with the hopping of the geofenced message information to determine when the geofenced message information is considered to be outside the geofenced.

Figure 4:
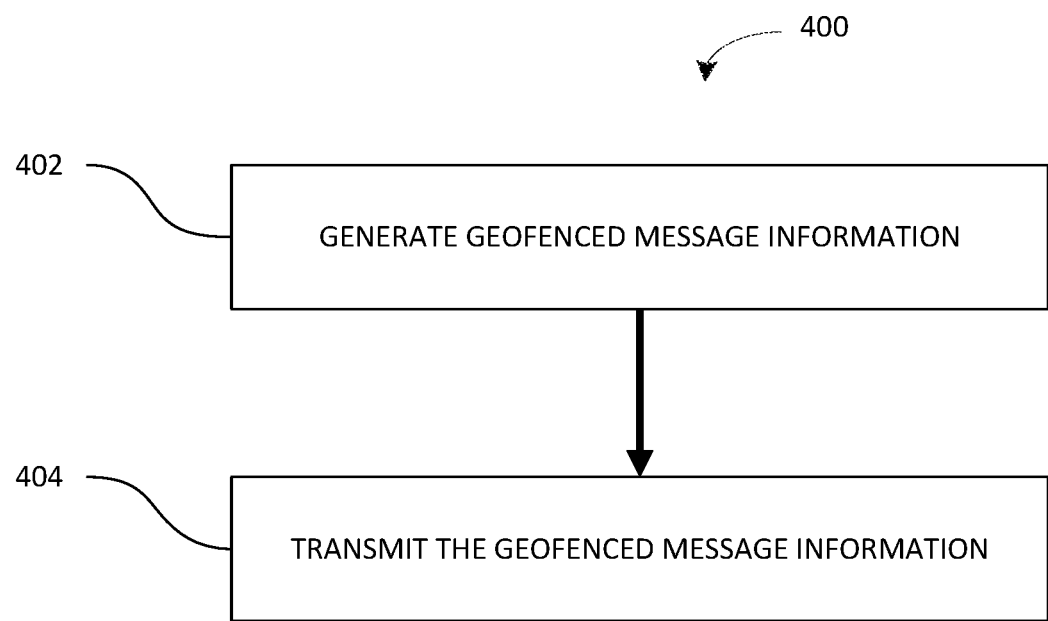
FIG. 4 illustrates an example method in accordance with one or more embodiments of the technology disclosed herein.

FIG. 4 illustrates an example method 400 that may be implemented in accordance with one or more embodiments of the technology disclosed herein. The steps of the method 400 may be implemented in/through one or more computing devices, such as one or more of the user devices 130A, 130B, 130C, 130D, 130E, 130F, 130G, 130H (as shown in FIG. 1 and described herein). At step 402, geofenced message information may be generated. The geofenced message information may define a geofenced message for one or more non-source nodes within a geofence At step 404, the geofenced message information may be transmitted. The geofenced message information may be transmitted for reception by one or more non-source nodes.

Figure 5:
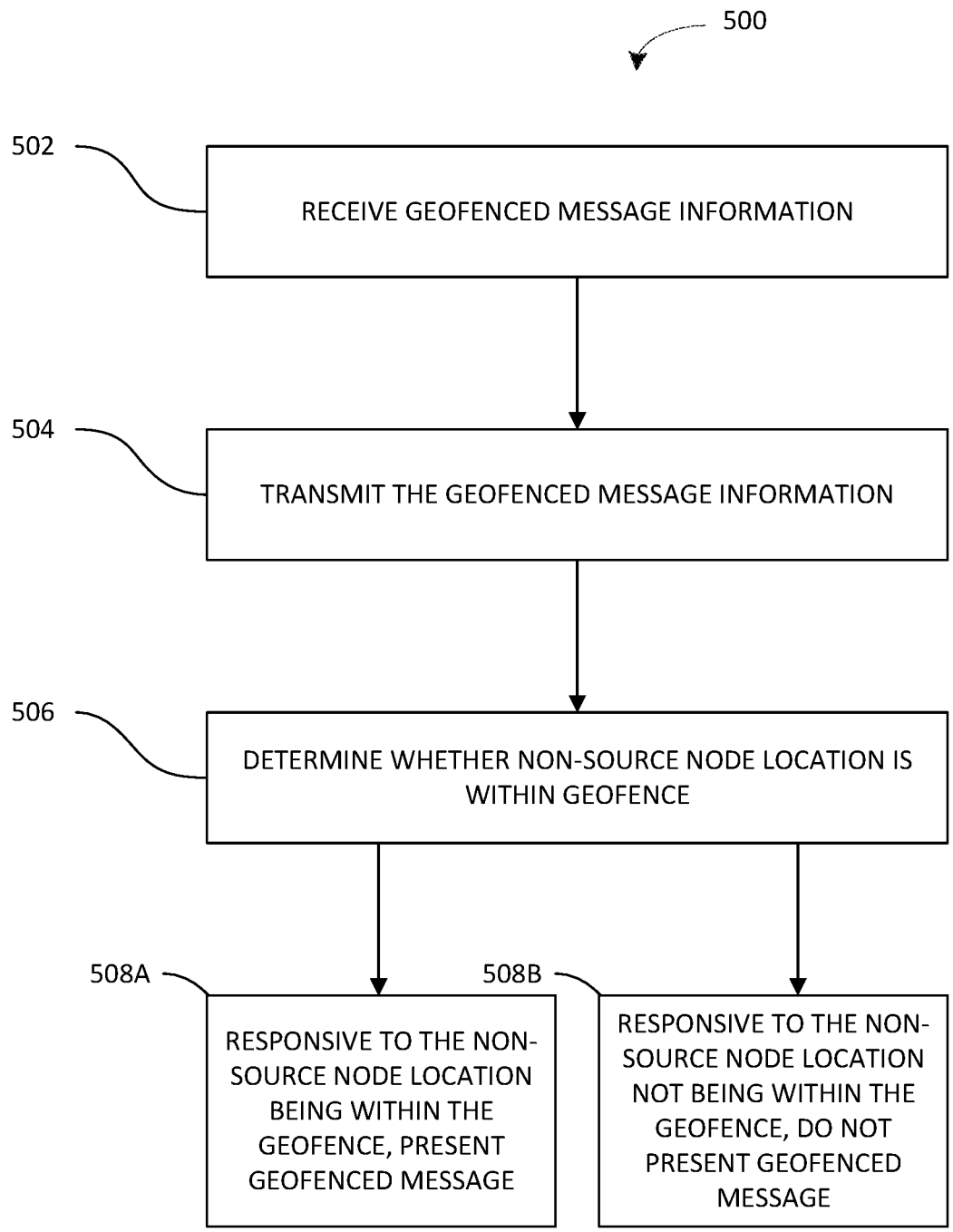
FIG. 5 illustrates an example method in accordance with one or more embodiments of the technology disclosed herein.

FIG. 5 illustrates an example method 500 that may be implemented in accordance with one or more embodiments of the technology disclosed herein. The steps of the method 500 may be implemented in/through one or more computing devices, such as one or more of the user devices 130A, 130B, 130C, 130D, 130E, 130F, 130G, 130H (as shown in FIG. 1 and described herein). At step 502, geofenced message information may be received. The geofenced message information may define a geofenced message for one or more non-source nodes within a geofence. The geofenced message information may be received by a non-source node. At step 504, the geofenced message information may be transmitted by the non-source node for reception by one or more other non-source nodes. At step 506, whether the location of the non-source node is within the geofenced may be determined. At step 508, responsive to the non-source node location being within the geofence, the geofenced message may be presented by the non-source node. At step 510, responsive to the non-source node location not being within the geofenced, the geofenced message may not be presented by the non-source node.

As used herein, the term circuit/logic might describe a given unit of functionality that can be performed in accordance with one or more embodiments of the technology disclosed herein. As used herein, a circuit/logic might be implemented utilizing any form of hardware, software, firmware, or a combination thereof. For example, one or more processors, controllers, ASICs, PLAs, PALs, CPLDs, FPGAs, logical components, software routines or other mechanisms might be implemented to make up a circuit/logic. In implementation, the various circuits/logics described herein might be implemented as discrete circuits/logics or the functions and features described can be shared in part or in total among one or more circuits/logics. In other words, as would be apparent to one of ordinary skill in the art after reading this description, the various features and functionality described herein may be implemented in any given application and can be implemented in one or more separate or shared circuits/logics in various combinations and permutations. Even though various features or elements of functionality may be individually described or claimed as separate circuits/logics, one of ordinary skill in the art will understand that these features and functionality can be shared among one or more common software and hardware elements, and such description shall not require or imply that separate hardware or software components are used to implement such features or functionality.

Where components or circuits/logics of the technology are implemented in whole or in part using software, in one embodiment, these software elements can be implemented to operate with a computing or processing circuit/logic capable of carrying out the functionality described with respect thereto. One such example computing circuit/logic is shown in FIG. 12. Various embodiments are described in terms of this example-computing circuit 1200. After reading this description, it will become apparent to a person skilled in the relevant art how to implement the technology using other computing circuits/logics or architectures.

Figure 6:
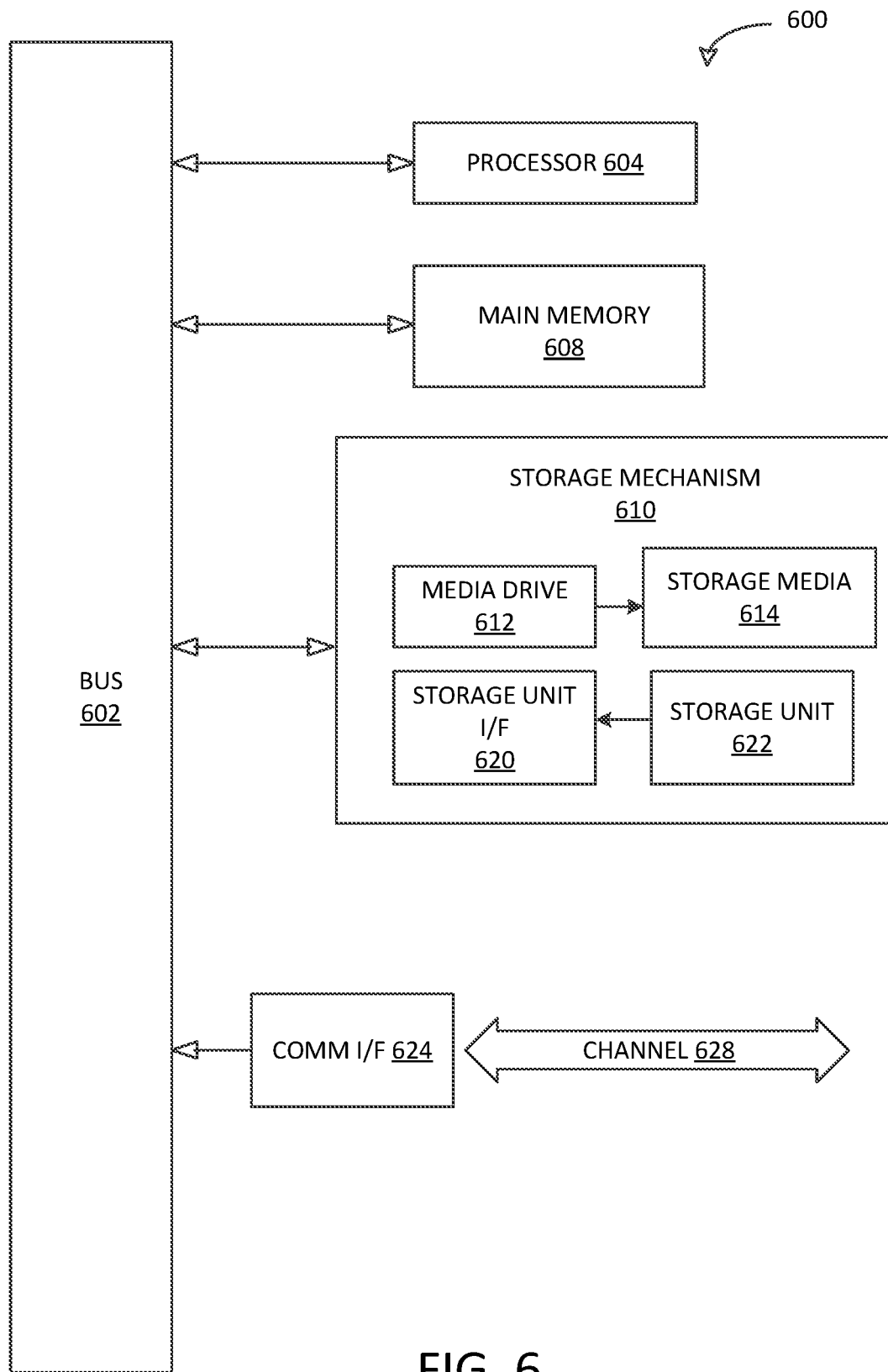
FIG. 6 illustrates an example computing circuit that may be used in implementing various features of embodiments of the technology disclosed herein.

Referring now to FIG. 6, computing circuit 600 may represent, for example, computing or processing capabilities found within desktop, laptop and notebook computers; hand-held/wearable computing devices (PDA's, smart phones, smart glasses, cell phones, palmtops, etc.); mainframes, supercomputers, workstations or servers; or any other type of special-purpose or general-purpose computing devices as may be desirable or appropriate for a given application or environment. Computing circuit 600 might also represent computing capabilities embedded within or otherwise available to a given device. For example, a computing circuit might be found in other electronic devices such as, for example, digital cameras, navigation systems, cellular telephones, portable computing devices, modems, routers, WAPs, terminals and other electronic devices that might include some form of processing capability.

Computing circuit 600 might include, for example, one or more processors, controllers, control circuits, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing circuit 600 or to communicate externally.

Computing circuit 600 might also include one or more memory components, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing circuit 600 might likewise include a read only memory ("ROM") or other static storage device coupled to bus 602 for storing static information and instructions for processor 604.

The computing circuit 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data. For example, one or more memory components may include non-transitory computer readable medium including instructions that, when executed by the processor 604, cause the computing circuit 600 to perform one or more functionalities described herein.

In alternative embodiments, information storage mechanism 610 might include other similar instrumentalities for allowing computer programs or other instructions or data to be loaded into computing circuit 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot, a PCMCIA slot and card, and other fixed or removable storage units 622 and interfaces 620 that allow software and data to be transferred from the storage unit 622 to computing circuit 600.

Computing circuit 600 might also include a communications interface 624. Communications interface 624 might be used to allow software and data to be transferred between computing circuit 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing circuit 600 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent circuit names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "circuit" does not imply that the components or functionality described or claimed as part of the circuit are all configured in a common package. Indeed, any or all of the various components of a circuit, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
   a source node and a plurality of non-source nodes;
   wherein the source node is configured with machine readable instructions which, when executed by a processor, cause the source node to:
      define a geofence based on input from a user associated with the source node;
      generate geofenced message information, the geofenced message information defining a geofenced message for one or more non-source nodes within the geofence; and
      transmit the geofenced message information for reception by a first non-source node among the plurality of non-source nodes, the first non-source node within a communication range of the source node;
   wherein the first non-source node among the plurality of non-source nodes is configured with machine readable instructions which, when executed by a processor, cause the first non-source node to:
      receive the geofenced message information; and
      transmit the geofenced message information for reception by one or more other non-source nodes among the plurality of non-source nodes within a communication range of the first non-source node;
      determine whether the first non-source node is located within the geofence;
      responsive to determining that the first non-source node is located within the geofence, presenting the geofence message on a display of the first non-source node; and
      responsive to determining that the first non-source node is not located within the geofence, not presenting the geofenced message on the display of the first non-source node;
   wherein the geofenced message information defines a limit on a number of times the geofenced message information can be transmitted by the first non-source node;
   wherein the geofenced message information is transmittable to a non-source node located outside the geofence and transmittable by the non-source node located outside the geofence, but is not presentable on the non-source node located outside the geofence until the non-source node moves to a location within the geofence.

2. The system of claim 1, wherein defining a geofence comprises receiving from a user through an interface of the source node a selection of one of a plurality of potential geofences presented for selection by the user.

3. The system of claim 1, wherein defining a geofence is based on free-form input from a user through an interface of the source node, the free-form input delineating the shape and size of the geofence.

4. The system of claim 1, wherein the geofence defines a two-dimensional boundary.

5. The system of claim 1, wherein the geofence defines a three-dimensional boundary.

6. The system of claim 1, wherein the first non-source node is further configured to perform modifying the geofenced message information before transmitting the geofenced message information.

7. The system of claim 1, wherein the limit on a number of times the geofenced message information can be transmitted by the first non-source node changes dynamically based on movement of the first non-source node.

8. The system of claim 1, wherein the limit on a number of times the geofenced message information can be transmitted by the first non-source node changes dynamically based on movement of the first non-source node in relation to a geofence boundary.

9. The system of claim 1, wherein the communication range of the first non-source node extends beyond at least one boundary of the geofence.

10. A method, comprising:
    defining a geofence based on input from a user associated with a source node;

generating a geofenced message information, the geofenced message information defining a geofenced message for one or more non-source nodes within the geofence; and transmitting, from a source node, the geofenced message information for reception by a first non-source node among the plurality of non-source nodes, the first non-source node within a communication range of the source node;

receiving, at the first non-source node, the geofenced message information; and transmitting, from the first non-source node, the geofenced message information for reception by one or more other non-source nodes within a communication range of the first non-source node;

determining whether the first non-source node is located within the geofence;

responsive to determining that the first non-source node is located within the geofence, presenting the geofence message on a display of the first non-source node; and responsive to determining that the first non-source node is not located within the geofence, not presenting the geofenced message on the display of the first non-source node;

wherein the geofenced message information defines a limit on a number of times the geofenced message information can be transmitted by the first non-source node;

wherein the geofenced message information is transmittable to a non-source node located outside the geofence and transmittable by the non-source node located outside the geofence, but is not presentable on the non-source node located outside the geofence until the non-source node moves to a location within the geofence.

11. The method of claim 10, wherein defining a geofence comprises receiving from a user through an interface of the source node a selection of one of a plurality of potential geofences presented for selection by the user.

12. The method of claim 10, wherein defining a geofence is based on free-form input from a user through an interface of the source node, the free-form input delineating the shape and size of the geofence.

13. The method of claim 10, wherein the geofence defines a two-dimensional boundary.

14. The method of claim 10, wherein the geofence defines a three-dimensional boundary.

15. The method of claim 10, wherein the first non-source node is further configured to perform modifying the geofenced message information before transmitting the geofenced message information.

16. The method of claim 10, wherein the limit on a number of times the geofenced message information can be transmitted by the first non-source node changes dynamically based on movement of the first non-source node.

17. The method of claim 10, wherein the limit on a number of times the geofenced message information can be transmitted by the first non-source node changes dynamically based on movement of the first non-source node in relation to a geofence boundary.

18. The method of claim 10, wherein the communication range of the first non-source node extends beyond at least one boundary of the geofence.

* * * * *